United States Patent
Leeseberg et al.

(10) Patent No.: US 10,774,956 B2
(45) Date of Patent: Sep. 15, 2020

(54) ORIFICE HOLDER CONSTRUCTION

(71) Applicants: Tony Byron Leeseberg, Itasca, IL (US); Kirk Watkins, Itasca, IL (US)

(72) Inventors: Tony Byron Leeseberg, Itasca, IL (US); Kirk Watkins, Itasca, IL (US)

(73) Assignee: Burner Systems International, Inc., Chattanooga, TN (US)

( * ) Notice: Subject to any disclaimer, the term of this patent is extended or adjusted under 35 U.S.C. 154(b) by 458 days.

(21) Appl. No.: 15/671,965

(22) Filed: Aug. 8, 2017

(65) Prior Publication Data
US 2018/0245720 A1 Aug. 30, 2018

Related U.S. Application Data

(63) Continuation-in-part of application No. 15/284,669, filed on Oct. 4, 2016, now abandoned, which is a continuation-in-part of application No. 14/615,610, filed on Feb. 6, 2015, now Pat. No. 9,726,307, which is a continuation of application No. 11/848,736, filed on Aug. 31, 2007, now abandoned.

(60) Provisional application No. 60/957,258, filed on Aug. 22, 2007.

(51) Int. Cl.
*F16L 13/00* (2006.01)
*F16L 13/14* (2006.01)
*F23D 14/64* (2006.01)
*F23D 14/46* (2006.01)

(52) U.S. Cl.
CPC .......... *F16L 13/147* (2013.01); *F23D 14/46* (2013.01); *F23D 14/64* (2013.01); *F23D 2213/00* (2013.01); *Y10T 29/49826* (2015.01)

(58) Field of Classification Search
CPC ....... F16L 55/07; F16L 55/027; F16L 13/147; F23D 14/46; F23D 14/64; F23D 2213/00; F23D 14/06
See application file for complete search history.

(56) References Cited

FOREIGN PATENT DOCUMENTS

| EP | 0994301 A1 * | 4/2000 | ............. F23D 14/64 |
| FR | 2138360 A2 * | 1/1973 | ............. F23D 14/26 |

* cited by examiner

*Primary Examiner* — David Bochna
*Assistant Examiner* — James A Linford
(74) *Attorney, Agent, or Firm* — Stephen J. Stark; Miller & Martin PLLC

(57) ABSTRACT

An orifice holder assembly provides a boss connected by at least one arm to a base having an outlet therethrough. The boss is provided below the outlet. A tube is inserted through the boss until a bead contacts a first boss surface and the tube end is then deflected to form a lip where the lip and the bead connects the tube to the boss. An orifice body is then inserted in the tube end.

20 Claims, 6 Drawing Sheets

ORIFICE HOLDER CONSTRUCTION

CLAIM OF PRIORITY

This application is a continuation in part of U.S. patent application Ser. No. 15/284,669 filed Oct. 4, 2016, which is a continuation in part of U.S. patent application Ser. No. 14/615,610 filed Feb. 6, 2015 which is a continuation of U.S. patent application Ser. No. 11/848,736 filed Aug. 31, 2007 which claims the benefit of U.S. Provisional Patent Application No. 60/957,258 filed Aug. 22, 2007, all of such priority claim applications are incorporated herein by reference in their entirety.

FIELD OF THE INVENTION

The present invention relates to a tubing assembly and more particularly, to tube orifice and orifice holding assembly improvements.

BACKGROUND OF THE INVENTION

Member and tube assemblies such as the improvements shown in U.S. Pat. Nos. 5,607,194 and 5,727,303 have been performed by the applicant. While these improvements are useful, in order to connect the tube and orifice to an orifice holder, a separate connection system has been utilized to perform that connection. In the prior art, this connection was been done typically by screwing the threads such as the threads 41 of FIG. 4 of U.S. Pat. No. 5,607,194 into cooperating threads of an orifice holder. While this would provide easy installation replacement, it also could allow for such conditions to exist as imprecise placement of a tube relative to the orifice holders, (i.e., such as if the fitting was not inserted the proper amount). Furthermore, since the tubes which are connected to the fittings are not usually straight when they are installed in an oven, it may be extremely difficult to rotate a tube relative to an installed orifice holder. Furthermore, since there are not normally any moving parts at this location once installed, the opportunity for failure of these component parts is particularly small so replacement of one part relative to the other is not believed to be commonly performed.

While the prior art technology is certainly useful and continues to be widely practiced by the applicant, an improved manufacturing method and completed apparatus is believed to be desirable at least for some applications.

SUMMARY OF THE INVENTION

It is an object of the present invention to provide a tube securely connected to an orifice holder independent of cooperating threads.

It is another object of the present invention to provide a tube connected to an orifice holder in an improved manner.

It is another object of the present invention to provide a tube secured to an orifice holder such that the tube is connected to the orifice holder by the use of at least one tool applied through an air/fuel outlet of the orifice holder during the manufacturing process.

It is another object of many embodiments of the present invention to provide an orifice holder to mount below a stove surface so that air and gas mixture may be provided to a burner head located above the stove surface for cooking.

It is another object of many embodiments of the present invention to provide an orifice holder to mount to a cup which locates the orifice below the stove surface and connects thereto and supports a burner head thereabove.

Accordingly, an orifice holder, tube and orifice assembly of the presently preferred embodiment preferably includes a tube which includes a bead or other stop on an exterior surface of the tube which contacts a first position of an orifice holder. A portion of the tube passes through a bore extending from the first position to a second position in the orifice holder. A tool such an a mandrel is preferably inserted through an outlet of the orifice holder and is used to flare out the tube at a second position of the orifice holder so that the tube is then secured to the orifice holder so that the orifice holder outlet as well as the tube outlet are disposed beyond the second position of the orifice holder. The tube is then provided with an orifice such as by screwing the orifice into the tube. The preferred method is believed to provide a cost savings to the manufacturer through construction while providing a high quality product for the completed product. The orifice holder mounts to an underside surface of a range whereby air/fuel is mixed before being directed through the outlet where a burner body with flame ring and cap is provided above the upper surface of a stove or range.

The orifice holder is preferably located in an orifice holder cup for many embodiments.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
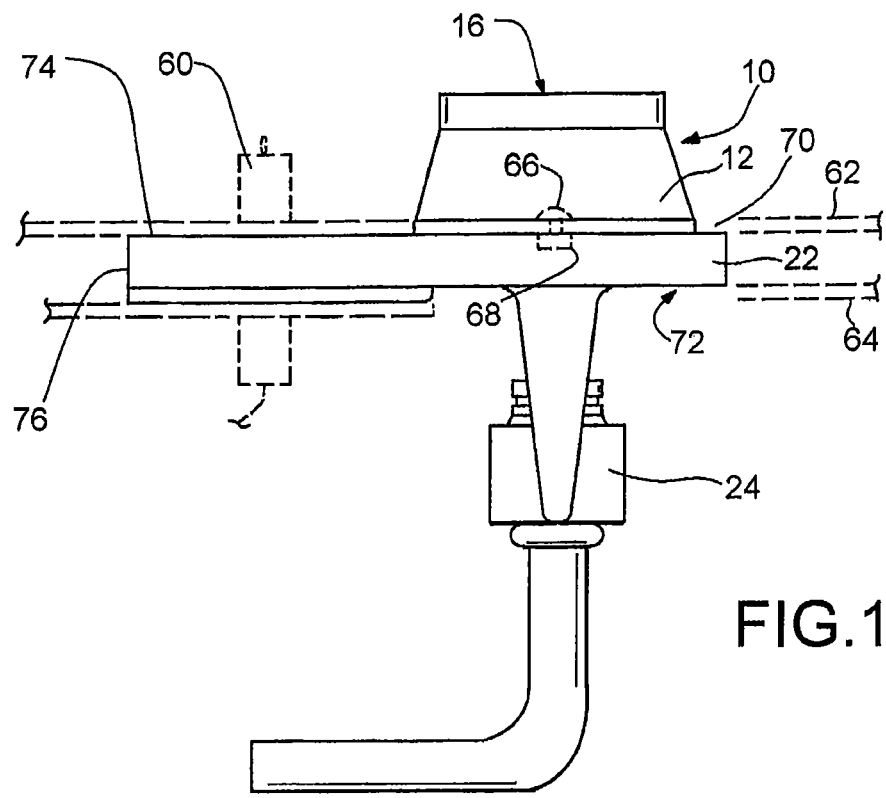
FIG. 1 shows a side view of an assembled orifice holder connected to a tube and an orifice of the presently preferred embodiment of the present invention from a side view installed in a stove.

FIG. 1 shows an orifice holder assembly 10 having an orifice holder 12 which is typically a cast part, and in the preferred embodiment, has been cast out of aluminum. Of course, other manufacturing techniques could be utilized to make other orifice holders. Casting has been found to be economical while providing a quality product.

Figure 2:
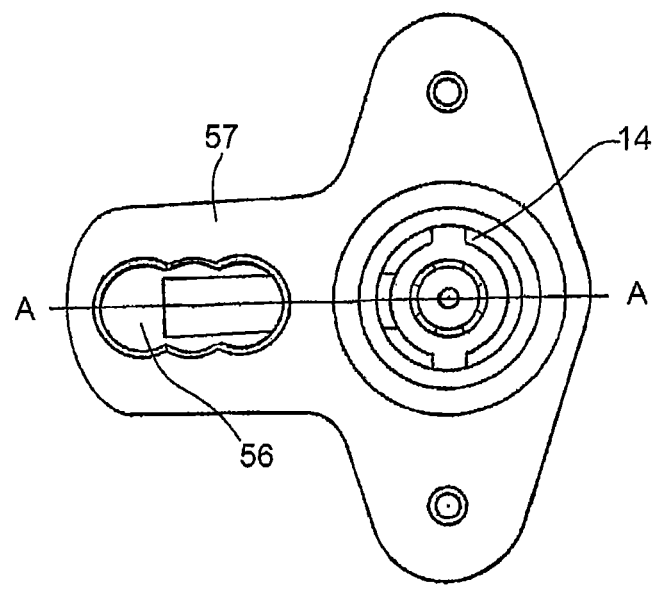
FIG. 2 shows a top view of the orifice holder assembly shown in FIG. 1.

The orifice holder 12 has an outlet 14, shown in FIG. 2, at a top end 16. The outlet 14 of this embodiment is illustrated as being at least substantially round and directs a fuel gas mixture from below through the outlet 14 past the top end 16 for use by a burner which is not shown. Many burner designs have been constructed. Other orifice holders have been utilized in the past for such uses.

Figure 3:
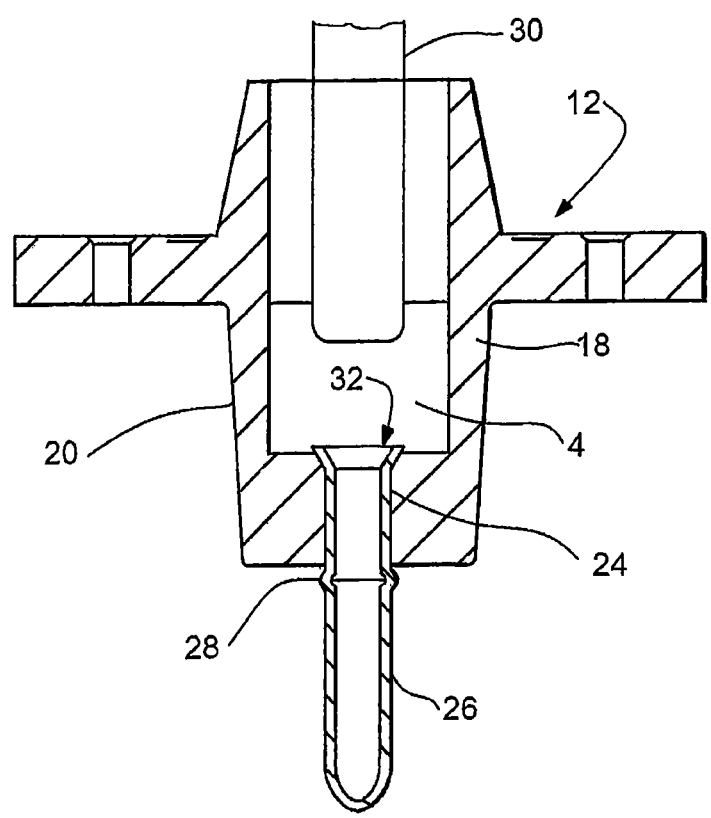
FIG. 3 shows a process of manufacturing the orifice holder assembly as shown in FIGS. 1 and 2.
Figure 4:
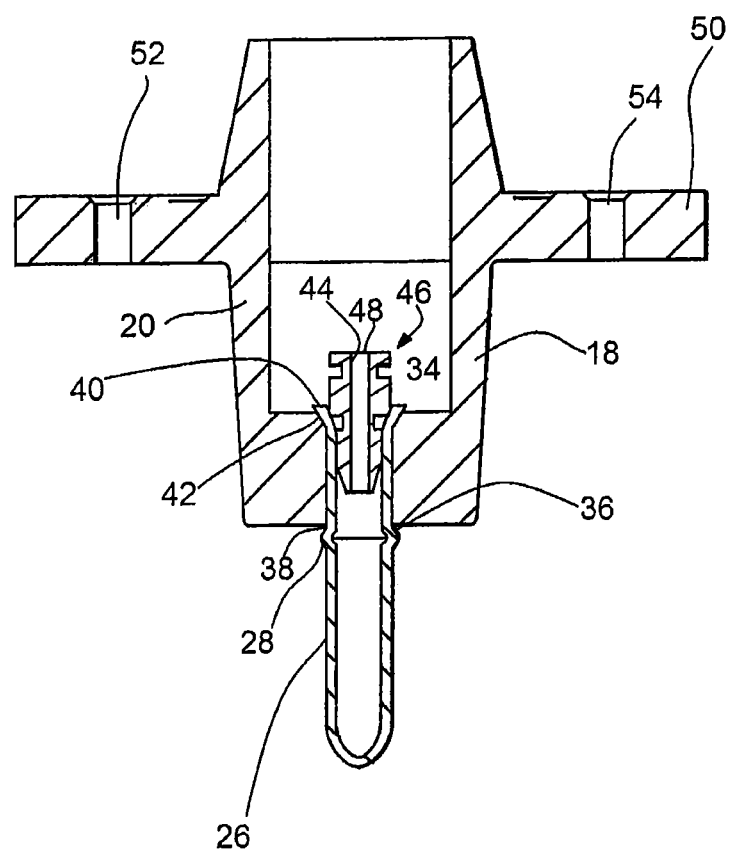
FIG. 4 shows a detailed cross sectional view of a detail marked as A in FIG. 3 after the manufacturing step has been completed and the orifice installed as would be in FIGS. 1-2.

This orifice holder has two arms 18, 20 which are shown in FIG. 3, at least substantially symmetrically extending from a base 22. These arms 18, 20 connect at a boss 24 which is configured to have a bore therethrough which receives a portion of tube 26 therethrough. A bead 28 is preferably utilized to stop the tube 26 a desired position relative to the boss 24 as shown in FIGS. 3 and 4 during the assembly process. Other mechanisms known in the art can also be utilized which provide a stop so that no further travel of the tube 26 through the bore can occur due to the presence of the bead 28.

Once the tube 26 is installed as shown in FIG. 3, an anvil 30 or other device is inserted through the outlet 14 of the orifice holder 12 and causes the end 32 of the tube 26 to be deflected such as shown in FIG. 4 so that the boss 24 of the orifice holder is secured relative to the lip 34 created by the bent tube 26 and the bead 28. This method of construction is believed to be a large improvement over the prior art in that in the prior art such as shown in U.S. Pat. Nos. 5,607,194 and 5,727,303.

In the prior art, a separate nut and thread arrangement was utilized to secure those fittings to orifice holders. By manufacturing an orifice holder as shown and described in the figures herein, at least several manufacturing steps and parts can be omitted which is believed to result in a cost savings to at least the manufacturer, if not the end user.

As shown in FIG. 4, the bead 28 has a boss engagement flange 36 which is shown adjacent to boss surface 38 and lip 34 as a lip engagement surface 40 which engages boss surface 42. Additionally, arms 18, 20 are illustrated extending above the lip 34 as well as above orifice body 46.

After connecting the tube 26 to the orifice holder 12, if the tube end 32 is not already provided with threads is may be tapped so that it has threads 44 as shown in FIG. 4 by directing the tap (not shown) through the outlet 14 and providing the threads 44 as shown in FIG. 4 in a similar manner as anvil 30 is shown applied in FIG. 3. Alternatively, and more preferably, the orifice body 46 may make its own threaded connection (i.e., somewhat self tapping). The orifice body 46 with its cooperating threads is then inserted preferably through the outlet 14 so that its cooperating threads engage threads 44 so it can be provided in the position shown in FIG. 4. The orifice body 46 then has bore 48 which allows for the gas from the tube 26 to then mix with air in the space 49 prior to being directed through the outlet 14 where mixing can further continue to occur within a burner (not shown) before being lit and providing heat in a stove type configuration.

While it is alternatively possible to provide an anvil 30, tap or orifice at the space 48 below to the base 22 to flare the lip 34 and/or install the orifice body 46 in a similar manner, the presently preferred embodiment as described herein provides the connection of the tube 26 to the boss 24 through application through the outlet 14 as well as the machining of the tube 26 to provide threads 44 if not done prior to the installation of the tube 26 to the boss 24. Finally it is also presently preferred to install the orifice body 46 through the outlet 14.

It is important to remember that in the prior art the machining of the tube 26 to a fitting has been performed before installing the fitting to an orifice holder 12. Opposing shoulders 50 are shown extending from the base 22. The shoulders 50 have vertically oriented or extending bores 52, 54 extending therethrough for a connection to a stove as shown in FIG. 1 in one of two alternatively preferred connections. Thus, the orifice holder 10 as would be understood by one of ordinary skill in the art starts the mixing process of air and gas below the connection of the shoulders to the top of the stove.

Depending on the manufacturer, the orifice holder 10 is connected to a stove top 62 or 64 (but not both) as shown with at least one shoulder 50. Both an on top and a to bottom connection are shown in FIG. 1. Obviously, one of the two would be selected.

Connector 66 is a screw connected through the stove top 62 to a nut 68 but could be similarly connected to stove top 64 as would be understood by those of ordinary skill in the art through one or more bores 52.54 through one or more shoulder(s) 50. A similar or dissimilar connection could be provided when connecting to stove top 64.

Meanwhile the stove top 62 or 64 would have a bore, such as one of bores 70, 72 so that a gas/air mixture would proceed from the orifice body 46 through the outlet 14 with the mixing beginning below the stove top 62 or 64. Additionally a bore would be located through either of the stove tops 62 or 64 in many embodiments so that an ignitor 60 could proceed through the passage 56 (which shows three possible locations, there certainly could be other passage constructions to accommodate ignitors, such as 60. The passage 56 is preferably provided through an extension 57 integrally formed (i.e., casted) with much of the remainder of the orifice holder 10. The extension 57 can be between the shoulders 50 as illustrated or otherwise provided.

One of a top surface 74 of at least one of the shoulder(s) 50 and a bottom surface 76 of at least one the shoulder(s) 50 contacts the stove top 62 or 64 as shown for many embodiments. A burner ring (not shown) can rest on top of the slanted surfaces 80 about the outlet 14 to direct a ring of flame above the stove top (62 or 64). Other embodiments have the orifice holder 10 connected to an underside of the of a bottom planar surface of the burner casting (i.e., the bottommost part in most constructions, which is essentially almost coplanar with the remainder of the stove top 62) which effectively provide a portion of the stove top 62 shown in FIG. 1 to which the orifice holder 10 connects from below. In all of the embodiments, the orifice body 46 is below, and preferably spaced below, the stove top 62 or 64.

Figure 5:
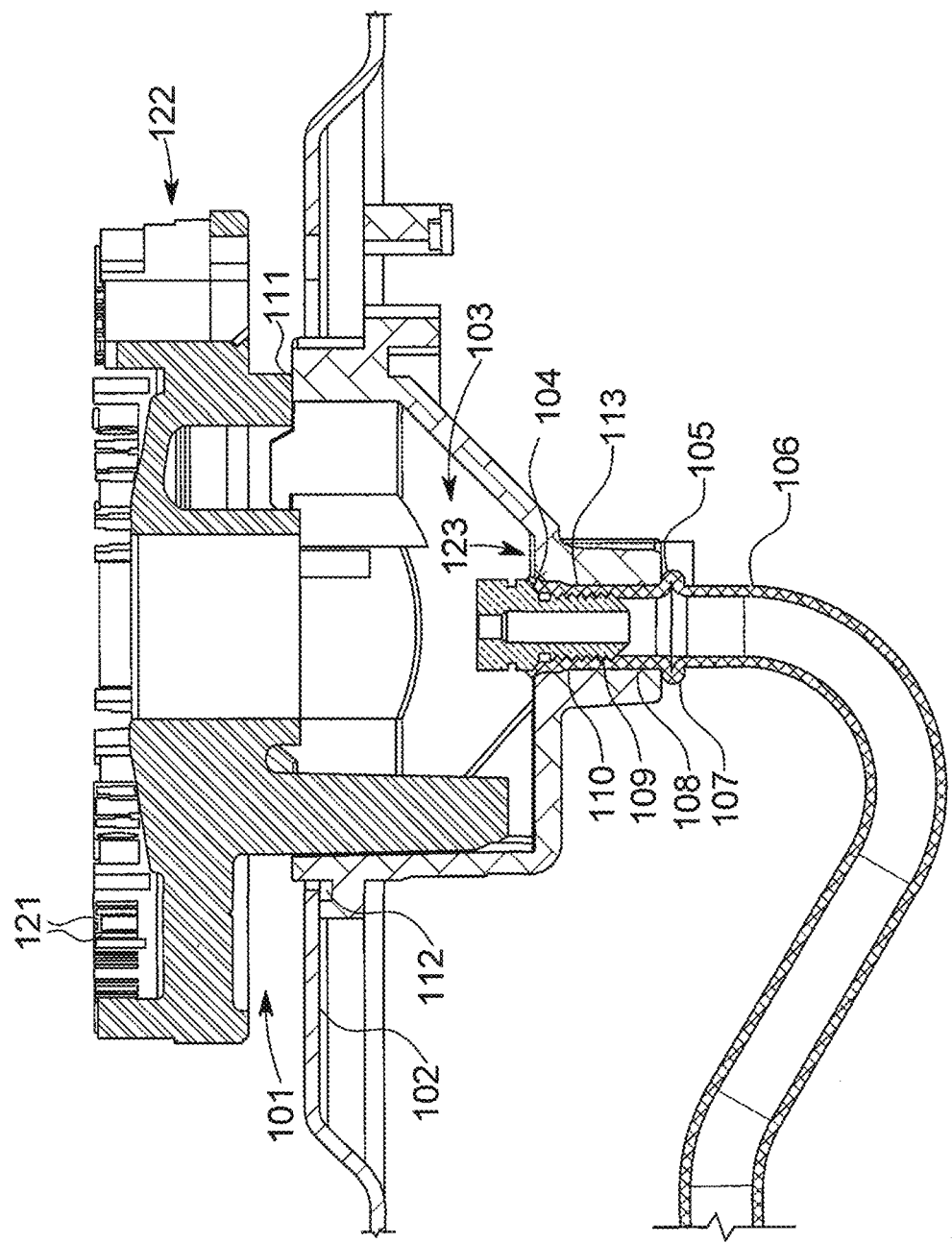
FIG. 5 is a detailed cross sectional view of a first alternatively preferred embodiment.
Figure 6:
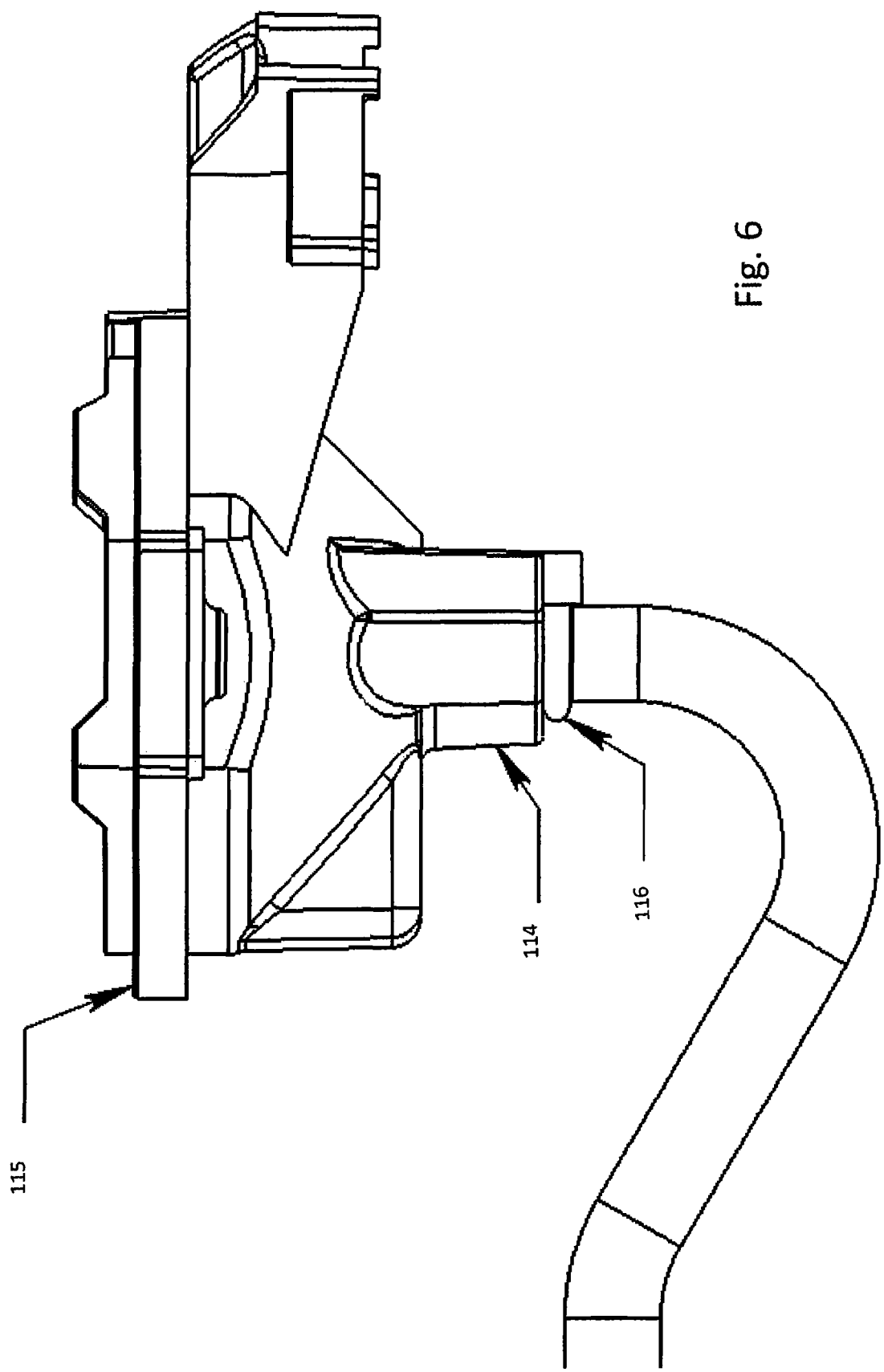
FIG. 6 is a side plan view of the first alternatively preferred embodiment of FIG. 5.
Figure 7:
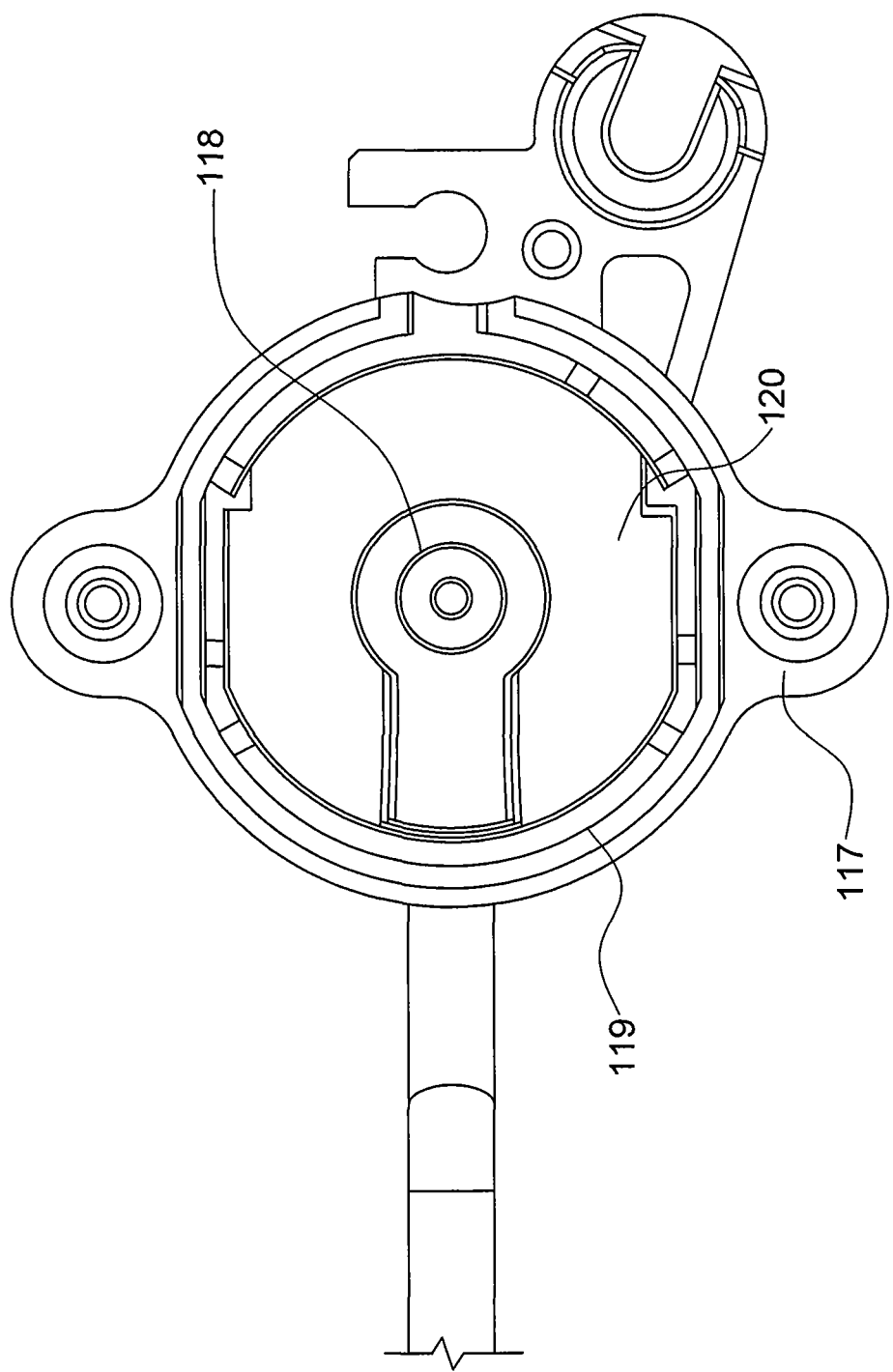
FIG. 7 is a top plan view of the first alternatively preferred embodiment of FIGS. 5-6.

FIG. 5 shows a first alternatively preferred embodiment of the present invention. The burner 101 connects to a cooktop 102 and provides flame orifices 121 through which flames originate when a fuel/air mixture is ignited as occurs with the embodiment above and other burners 101 used with cooktops 102. The burners 101 are used normally as a portion of gas cooking appliances such as cooktops, ranges, etc. . . . The burner ring 122 has the flame orifices and the cap (not shown) is removed for clarity but rests atop the burner ring 122 as is known in the art.

Injector or orifice 118 is illustrated being supported by an orifice holder cup 120. A gas supply tube 106 provides gas, normally natural gas or propane, through the orifice 118 to enter the cavity 103 disposed above and about the orifice holder cup 120. Just like the embodiment described above, the tube 106 can be provided with a bead 107 which can contact a lower surface 105 of a boss 114. The tube 106 can then be bent to provide a lip 113 at upper surface 123 of boss 114 to connect the tube 106 to the orifice holder cup 120 as discussed above or otherwise. Orifice body 104 can then be inserted into the tube 106 as occurs with the embodiment described above, or otherwise, such as through the lip 113 and have threads 109 which connect to an inner surface of the tube 106. Meanwhile outer surface 110 of tube 106 proceeds through an internal bore (along 110) of boss 108 as would be understood by those of ordinary skill in the art.

The burner 101 illustrated is an "air from top" burner 101, where all or a majority of the primary air utilized with combustion from the air/gas mixture emanating from the ports 121 of the burner ring comes from above the cooktop 102 (and not from below). A majority could be defined as at least greater than 50%, at least ⅔, at least ¾ or more than about 90% depending on the specific embodiment.

The orifice holder cup 120 can include one or more location(s) for burner mountings 111 and 119, one or more bases 115, 117 such as could be utilized to connect to the cooktop 102. For many embodiments, the connection of the cup 120 to the cooktop 102 are completely sealed connections which could, for many embodiments, provide for all of the air to be from above the cooktop 102. Other embodiments may provide for mostly sealed connections. The burner cup 120 can be fully or mostly enclosed so that cavity 103 will not be affected by pressure changes below the cooktop (external to the cavity 103).

The boss 114 can be located underneath at a lower portion of the cup 120 and be connected to the burner inlet. Tube 106 can be inserted at a certain length into the boss 114. The bead 107 can provide for a positional stop on the inserted tube length. The tube, although typically by a mandrel, once inserted can be formed so that a portion of the tube 106 forms a lip onto the boss 114 to capture the placement. The orifice body 104 can then be installed and can mechanically seal itself to a section of the tube 106 which has been captured in the boss 114.

For some embodiments, this construction and assembly can eliminate one of the connection points of a typical orifice holder cup and therefore eliminate a potential gas leak pathway between the supply valve and metering orifice body 104. For many manufacturers, this construction technique can also reduce cost and complexity of the cast or formed cup 120.

An orifice holder assembly may comprise a cast orifice holder of unitary construction having a base 111, 119 connected by a cup 103 to a boss 114, said boss 114 located at or towards a bottom portion of the cup 120 and having a bore 108 therethrough extending from a first boss surface 105 to a second boss surface 123 with said second boss surface 123 located above the first boss surface 105, said base 111, 119 having an outlet extending thereacross above the boss 114, with the boss 114 integrally connected by the cup 120 to the base 111 and/or 119, the base 111, 119 having at least one shoulder 117 for connecting the orifice holder to a cooktop 102. A tube 106 may be received by the boss 114, said tube 106 having a preformed bead 107 disposed about the tube 106 spaced from a tube end, said bead 107 contacting the first boss surface 105 with a portion of the tube 106 extending through the bore 108 of the boss 114, said tube 106 then deformed at the tube end to provide a lip 113 with a lip engagement surface in contact with the second boss surface 123 external to the bore with the lip 113 and the bead 107 forming a mechanical connection of the tube 106 to the boss 114 by entrapping a portion of the boss 114 between the lip 113 and bead 107.

Additionally, an orifice body 104 may be connected to the tube end and having a bore therethrough, said orifice body 104 located below the base 111 and 119 with a cavity 103 above the orifice body 104 and below the base 111 and/or 119 and said orifice body 104 terminating internal to the boss 114 above the first boss surface 105, wherein the cup 120 extends from the base 111, 119 to the boss 114, wherein the base 111, 119 and the boss 120 are longitudinally separate and the cup 120 extends from an internal perimeter of the base 111, 119 to an external perimeter of the boss 114, and at least 50 percent of air mixed with fuel from the orifice body 104 is received from above the cooktop 102.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

The invention claimed is:

1. An orifice holder assembly comprising:
a cast orifice holder of unitary construction having a base connected by a cup to a boss, said boss located at a bottom portion of the cup and having a bore therethrough extending from a first boss surface to a second boss surface with said second boss surface located above the first boss surface, said base having an outlet extending thereacross above the boss, with the boss integrally connected by the cup to the base, the base having at least one shoulder for connecting the orifice holder to a cooktop;
a tube received by the boss, said tube having a preformed bead disposed about the tube spaced from a tube end, said bead contacting the first boss surface with a portion of the tube extending through the bore of the boss, said tube then deformed at the tube end to provide a lip with a lip engagement surface in contact with the second boss surface external to the bore with the lip and the bead forming a mechanical connection of the tube to the boss by entrapping a portion of the boss between the lip and bead; and
an orifice body connected to the tube end and having a bore therethrough, said orifice body located below the base with a cavity above the orifice body and below the base and said orifice body terminating internal to the boss above the first boss surface;
wherein the cup extends from the base to the boss, wherein the base and the boss are longitudinally separate and the cup extends from an internal perimeter of the base to an external perimeter of the boss, and at least 50 percent of air mixed with fuel from the orifice is received from above the cooktop.

2. The orifice holder assembly of claim 1 wherein the orifice body has external threads which are in contact with an internal portion of the tube toward the tube end.

3. The orifice holder assembly of claim 1 wherein at least 75 percent of air mixed with fuel from the orifice is received from above the cooktop.

4. The orifice holder assembly of claim 3 wherein at least 90 percent of air mixed with fuel from the orifice is received from above the cooktop.

5. The orifice holder of claim 1 wherein the orifice holder is cast aluminum.

6. The orifice holder assembly of claim 1 manufactured by the process of providing a tube end having a smaller cross section than the bore of the boss until physically deflected to provide the lip, inserting the tube end through the bore of the boss until the bead contacts the first boss surface, and then deflecting the tube end to provide the lip external to the bore of the boss.

7. The orifice holder assembly of claim 6 wherein the process of manufacturing the orifice holder assembly further comprises after deflecting the tube end to provide the lip, then inserting the orifice body at the tube end.

8. The orifice holder assembly of claim 7 wherein the orifice body has self-tapping external threads which connect the orifice body to the tube end.

9. An orifice holder assembly comprising:

a cast orifice holder having an outlet in a base spaced above at least one shoulder with a vertically extending bore for connecting to a cooktop, and the orifice holder further having the base connected by a cup to a boss of a unitary construction, said boss located under the outlet and having a bore therethrough extending from a first boss surface to a second boss surface with said second boss surface located above the first boss surface and the outlet, with the base integrally connected by the cup to the boss;

a tube received by the boss, said tube having a preformed bead disposed about the tube spaced from a tube end, said bead contacting the first boss surface with a portion of the tube extending through the bore of the boss, said tube deformed after insertion to provide a lip at the tube end with a lip engagement surface in contact with the second boss surface external to the bore with the lip and the bead forming a mechanical connection of the tube to the boss by entrapping a portion of the boss between the lip and bead; and an orifice body connected to the tube end and having a bore therethrough, said orifice body located below the outlet with a cavity above the orifice body and below the outlet, and said orifice body terminating internal to the boss above the first boss surface;

wherein the cup extends from the base to the boss, wherein the base and the boss are longitudinally separate and concentric with each other and the cup extends from an internal diameter of the base to an external diameter of the boss.

10. The orifice holder assembly of claim 9 manufactured by the process of providing a tube end having a smaller cross section than the bore of the boss until physically deflected to provide the lip, inserting the tube end through the bore of the boss until the bead contacts the first boss surface, and then deflecting the tube end to provide the lip external to the bore of the boss.

11. The orifice holder assembly of claim 10 wherein the tube end is physically deflected with a device extending through the outlet of the orifice holder which is removed after forming the lip.

12. The orifice holder assembly of claim 11 wherein the process of manufacturing the orifice holder assembly further comprises after deflecting the tube end to provide the lip, then inserting the orifice body at the tube end.

13. The orifice holder assembly of claim 12 wherein the orifice body has self-tapping external threads which connect the orifice body to the tube end.

14. The orifice holder assembly of claim 9 wherein the orifice body has external threads which are in contact with an internal portion of the tube toward the tube end and the bead is located external to the bore.

15. The orifice holder assembly of claim 9 wherein the at least one arm is integrally connected to the base and the boss and the bead is located below the first boss surface.

16. The orifice holder assembly of claim 9 wherein the orifice holder is cast aluminum.

17. The orifice holder assembly of claim 9 wherein the orifice holder has at least two shoulders.

18. The orifice holder assembly of claim 9 wherein the cavity receives at least 75 percent of air to be fed with fuel from the orifice from above the cooktop.

19. The orifice holder of claim 9 wherein the cup is sealed to the cooktop thereby requiring all air mixed with the fuel to be received from above the cooktop.

20. The orifice holder of claim 9 wherein the cup is connected to the cooktop at the base.

* * * * *